Patented June 18, 1935

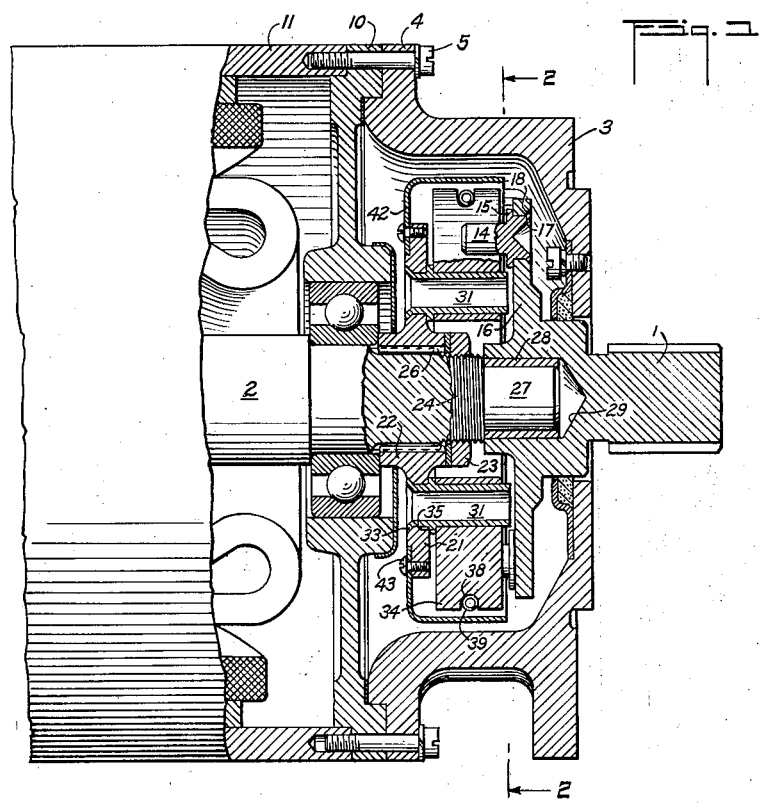

2,005,655

UNITED STATES PATENT OFFICE 2,005,655

DRIVING MECHANISM

Clinton H. Havill, South Orange, N. J., assignor, by mesne assignments, to Eclipse Aviation Corporation, East Orange, N. J., a corporation of New Jersey Application February 25, 1933, Serial No. 658,618

9 Claims. (Cl. 64—96)

This invention relates to driving mechanisms and more particularly to flexible drives in which a certain amount of relative rotation is possible between the driving and driven members.

Although not confined to such a use, the invention lends itself readily to use as a drive for generators or other auxiliary apparatus constituting part of the power plant of an internal combustion engine, which, by reason of the pulsations therein, tends to produce an impulsive, rather than a smooth steady drive.

When so employed, the invention operates on the principle of utilizing a number of non-flexible oscillatory elements so mounted as to respond to centrifugal force in such a manner as to constitute a flexible coupling; that is, a coupling which is sufficiently resilient to yield when subjected to impulses of excessive torque input, but otherwise effective to maintain a substantially uniform rate of torque transmission to the shaft of the generator or other unit to be driven.

A further object of the invention is to provide in a flexible coupling of the character above described, additional shock absorbing means of a resilient character, making it possible to transmit torque independently of the above described oscillatory elements immediately upon energization of the driving element, and even though the driven element is at rest at the moment of such initial energization, the tension in said resilient means being thereafter reduced in response to acceleration of the driven unit.

Another object is to provide a driving mechanism of novel construction in which the component parts are compactly and symmetrically positioned and readily accessible for inspection or repair.

These and other objects and advantages to be derived from the use of the invention herein disclosed reside in the inter-relation and method of operation of the parts and will become apparent upon inspection of the following specification when read with reference to the accompanying drawing wherein the preferred embodiments of the invention are illustrated. It is to be expressly understood, however, that the drawing is for the purpose of illustration only, and is not to be construed as a definition of the limits of the invention, reference being had for this purpose to the appended claims.

In the drawing,

Fig. 1 is a central longitudinal section of a device embodying the invention, as it appears when applied as a drive for a generator;

Fig. 2 is a transverse sectional view taken along the line 2—2 of Fig. 1, showing the elements in the relative positions which they occupy at the moment of greatest load, as for example, when starting, or at any subsequent period of momentary excessive torque input;

Fig. 3 is a similar transverse sectional view of a portion of the unit, showing the parts in the relative positions occupied during any period of zero torque transmission.

Referring to the drawing, and particularly to Fig. 1, the invention is illustrated as embodied in a driving mechanism comprising a driving member 1, a driven shaft 2, and a plurality of intermediate members of novel construction drivably connecting the members 1 and 2 and enclosed within a casing 3 having a flange 4 provided with openings through which suitable fastening means 5 may be inserted for attachment to an end plate 10 of the housing 11 of the generator or other device to be driven.

The novel means for coupling shafts 1 and 2 includes a plurality of driving pins 14 projecting axially from the disc 16 which as shown is integral with the driving member 1 and in which disc the pins 14 are rigidly secured as by providing shoulder 15 thereon and upsetting the ends 17 in the counterbored portions 18 of the openings in the disc 16, said openings being provided at points equally spaced from the center of rotation of the disc and at equal angular intervals as indicated in Figs. 2 and 3. A similar disc 21, having a hub 22 splined to the driven shaft 2, is adjustably held in place thereon by a nut 23 engaging the threaded portion 24 of the shaft 2, the said threaded portion being provided intermediate the splined portion 26 and the reduced end portion 27 piloted with the assistance of a friction reducing bearing 28, in the socketed portion 29 of the driving member 1.

Secured in and projecting laterally from openings in the disc 21 are pins 31, corresponding in number to the number of pins 14 and spaced in staggered relation to said pins and at equal radial distances from the center of rotation of the disc 21, said radial distances being less than the radial spacing of the pins 14. As shown, each pin 31 has head and shoulder portions 33 and 35 respectively, holding it in position in counterbored openings in the disc 21. On each pin is a weight 34 of substantially triangular formation, each weight having an arcuate outer surface, preferably grooved centrally as indicated at 38 in Fig. 1, to receive a toroidal spring 39 tending to hold said weights in the positions indicated in Fig. 3, toward which positions said weights are also urged by centrifugal force due to revolution about the axis of driving member 1. Upon acceleration of the driven shaft, as for example, in breaking said shaft away from its static position, the weights 34 are inclined from the true radial position (as indicated in Fig. 3) by the pressure exerted thereupon due to inertia of the driven part. Such pressure is exerted through the driving pins 14, assuming rotation to be in the clockwise direction as indicated by the arrow in Fig. 2.

Preferably a cylindrical guard 42 secured to the disc by suitable means 43 extends around the assembly of weights and the spring 39 to prevent the latter from flying outward sufficiently to escape from registry with the groove 38.

From the foregoing it will be apparent that the spring 39 will allow torque to be carried even when the device is started from standstill and will provide a resilient means to absorb the shocks from the driven part. The weights oscillate about their pivots when rapid oscillations or changes of speed occur in the driving part, thus tending to maintain a more even rotation of the driven part. As the speed increases, the weights tend more and more to be pulled toward the radial position; thus centrifugal force causes them to carry more and more of the load, although they can still oscillate about their pivots in response to relatively strong pulsations of incoming torque. In addition, the increase in speed causes the spring to be stretched more and more, due to the centrifugal effect of its own mass until finally it exerts practically no restraining effects on the weights. The device thus depends more on centrifugal action with increase of speed, thus relieving the spring of the high frequency vibrational forces which would tend to crystallize it and shorten its life.

However, if it is desired to have the spring act as a supplement, at all speeds, to the resilient drive afforded by the weights themselves, this may be brought about by decreasing the mass of the weights so that they become, in effect, merely oscillating cams acting upon the spring (which for this purpose may be of heavier construction). In such an arrangement the spring would act not only as the sole driving connection at zero R. P. M. (that is, at starting) but might also provide the major (or, for that matter, the entire) resilient driving factor during the entire period of operation.

Thus the invention provides means for smoothing out uneven torque impulses by creating oscillations in parts interposed between the driving and driven elements, the frequency and degree of oscillations being in proportion to the torque requirements.

The principle of the device would not be altered by putting the weights on the driving member instead of on the driven member, but for structural reasons the arrangement shown in the drawing is preferable.

Likewise other changes may be made in the construction and arrangement of the parts, such as the substitution of rubber in place of the spring 39 as the "resilient element" referred to in the claims, within the scope of the broadest of the appended claims.

What is claimed is:

1. In a device of the class described, a rotatable part to be driven, a driving member, an oscillatory part drivably connecting said driving member and part to be driven, and supplementary connecting means deflectable by said oscillatory part into a position of greater length wherein it becomes more effective to supplement said oscillatory part as a driving connection between said driving member and part to be driven, and means for mounting said oscillatory part, said mounting means comprising a pin having an axis at a fixed radial distance from the axis of the driving member.

2. In a device of the class described, a driving member, a driven member, a single resilient element drivably connecting said members, and means mounted eccentrically on said driven member for engagement with said resilient element to vary the stress therein in accordance with variations in the load to be driven.

3. In a device of the class described, a driving pin, a driven member, means including a toroidal spring acting to transmit torque from said pin to driven member, and means engageable with said spring to vary the stress therein in accordance with variations in the load to be driven, said last named means comprising a part eccentrically mounted on said driven member and disposed in the path of advance of said pin.

4. In a device of the class described, a driving member, a driven member, means including a toroidal spring acting to transmit torque from said driving member to said driven member, and means engageable with said spring to deflect said spring from a true circular path and thereby vary the stress therein in accordance with variations in the load to be driven.

5. In a device of the class described, a driving member, a driven member, means including a toroidal spring drivably connecting said members, and means engageable with said spring to vary the stress therein in accordance with variations in the load to be driven, said last named means comprising a part pivotally mounted on one of said members and movable relatively thereto.

6. In a device of the class described, a driving pin, a driven member, means including a toroidal spring drivably connecting said pin and driven member, and means engageable with said spring to vary the stress therein in accordance with variations in the load to be driven, said last named means comprising a part pivotally mounted on said driven member and disposed in the path of advance of said driving pin.

7. In a device of the class described, a driving pin, a driven member, means including a circumferentially disposed spring deflectable into a position of increased tension to transmit torque from said driving pin to said driven member, and means engageable with said spring to vary the stress therein in accordance with variations in the load to be driven, said last named means comprising a part eccentrically mounted on said driven member and movable relatively thereto.

8. In a device of the class described, a driving member, a driven member, means including a circumferentially disposed resilient member acting to transmit torque from said driving member to said driven member and means engageable with said resilient member to deflect said resilient member into a position of increased tension and thereby vary the stress therein in accordance with variations in the load to be driven.

9. In a device of the class described, a rotatable part to be driven, a driving member, an oscillatory part drivably connecting said driving member and part to be driven and supplementary connecting means deflectable by said oscillatory part into a position of greater length wherein it becomes more effective to supplement said oscillatory part as a driving connection between said driving member and part to be driven, and means for mounting said oscillatory part, said mounting means comprising a pin the axis of which constitutes the sole center of oscillation of said oscillatory part.

CLINTON H. HAVILL.